(12) United States Patent
Thomas et al.

(10) Patent No.: US 8,458,748 B2
(45) Date of Patent: Jun. 4, 2013

(54) SYSTEM AND METHOD FOR COMMANDING A CONTROLLED DEVICE

(75) Inventors: Jay Thomas, Denver, CO (US); Hugh Josephs, Boulder, CO (US); David Kimble, Boulder, CO (US); Patrick J. Donoghue, Sea Cliff, NY (US)

(73) Assignee: Time Warner Cable, Inc., New York, NY (US)

( * ) Notice: Subject to any disclaimer, the term of this patent is extended or adjusted under 35 U.S.C. 154(b) by 351 days.

(21) Appl. No.: 12/763,316

(22) Filed: Apr. 20, 2010

(65) Prior Publication Data

US 2011/0258660 A1 Oct. 20, 2011

(51) Int. Cl.
- *H04N 5/445* (2006.01)
- *H04N 7/173* (2006.01)
- *H04N 7/16* (2006.01)
- *H04N 5/44* (2006.01)

(52) U.S. Cl.
USPC ............... 725/50; 725/45; 725/132; 725/140; 725/152; 348/734

(58) Field of Classification Search
USPC ................. 348/734; 725/46, 50, 132
See application file for complete search history.

(56) References Cited

U.S. PATENT DOCUMENTS

| | | | | |
|---|---|---|---|---|
| 5,726,688 A * | 3/1998 | Siefert et al. | ................... | 715/821 |
| 6,618,754 B1 * | 9/2003 | Gosling | ....................... | 709/220 |
| 7,020,652 B2 * | 3/2006 | Matz et al. | ..................... | 707/752 |
| 7,266,777 B2 * | 9/2007 | Scott et al. | .................... | 715/762 |
| 7,987,491 B2 * | 7/2011 | Reisman | ....................... | 725/112 |
| 2003/0189509 A1 * | 10/2003 | Hayes et al. | ................... | 341/176 |
| 2005/0066370 A1 * | 3/2005 | Alvarado et al. | ............... | 725/80 |
| 2005/0160458 A1 * | 7/2005 | Baumgartner | .................. | 725/46 |
| 2007/0250864 A1 * | 10/2007 | Diaz Perez | ..................... | 725/52 |
| 2009/0150814 A1 * | 6/2009 | Eyer et al. | ..................... | 715/765 |
| 2010/0118209 A1 * | 5/2010 | Hardacker | .................... | 348/734 |

* cited by examiner

*Primary Examiner* — James R Sheleheda
(74) *Attorney, Agent, or Firm* — The Marbury Law Group, PLLC (57) ABSTRACT

A system and method for commanding a controlled device. An intelligent navigation server detects a transition from a current state of a remote control device. A context for transition is also determined. The current state, the new current state and the context are evaluated to select a set of commands appropriate to the context and the new current state. The selected commands determine behavior options for the controlled device. The set of selected commands are sent to the remote control device. Text and/or graphical data appropriate to the new current state may also be sent to the remote control device. The remote control device may generate display data based on the selected commands to provide one or more soft buttons linked to one or more of the selected commands. The remote control device may also display the text and/or graphical data.

26 Claims, 9 Drawing Sheets

SYSTEM AND METHOD FOR COMMANDING A CONTROLLED DEVICE

BACKGROUND

In the last 40 years, the TV experience has drastically evolved. Its main interaction device, the remote control, has not.

Consumer devices, particularly audio and video devices, are accessible through wireless remote control units (remotes). Typically, remotes send commands using infrared (IR) light as the carrier.

The first such devices were simple television remotes that allowed a user to select a channel, a volume setting, and to power the television set on and off. As televisions began to offer more features, the remotes also evolved into more flexible, albeit more complex, devices.

In the 70's, VCRs were introduced and the era of multiple remotes was born. Not only were users compelled to deal with separate remotes, but the devices these remotes controlled became "programmable." VCRs could be programmed for specific channels and languages and to record a program at a time in the future. Televisions were not only programmable with respect to the language and viewing channel, but with respect to a myriad of audio and video options as well. The audio/video (AV) receiver arrived with the introduction of Dolby Surround Sound. The AV receiver was also controllable remotely and programmable adding another later of complexity. Today, a "basic" entertainment center may include a television (or monitor), a VCR, a DVD player, an AV receiver, a CD player, a set top box (for cable), and a digital video receiver (for digital television and HDTV reception). This "basic" entertainment center can be expanded to include a wide variety of other consumer electronics devices.

The proliferation of remote controls led some manufactures to include "learning remotes" with their products. For example, the remote that controls the television set typically has a set of basic buttons to control a VCR and a database of VCR remote control codes. The remote is "told" what model of VCR is being operated and selects a remote control instruction set for that VCR. The remote control instruction set associates buttons on the remote control with commands that can be executed by the VCR. Alternatively, some remotes come with a learning mode that allows the remote for one device to teach its command list to a "master" remote. Because the remote typically has a limited number of buttons, the learning or master remote typically cannot capture all of the commands of the teaching remote. Adding more buttons and layers to the remote increases the complexity of the remote.

The interaction between a typical remote control and a controlled device is based on visual feedback between the user and a display device to which the controlled device is connected. For example, when interacting with a program guide of a set top box (STB), the user issues a command to the STB to display the program guide by pressing a designated button on the remote control and viewing the guide on a video display. The user navigates the cells of the program guide using another fixed button on the remote control. Typically, when a user navigates to a particular cell, the cell is highlighted. A program associated with the highlighted cell may be selected for viewing or recording (if a DVR is available) or the user may request additional information about the program. The user may view a program in progress by pressing a select button on the remote control.

If the program is in the future, and assuming a DVR is available, selecting the program causes the STB to display a DVR menu that allows the user to schedule the program for recording on the DVR. The DVR menu presents the user with additional screens that provide the user various recording options. Navigation of these menus is similar to the navigation of the program guide. To view a recorded program, a user must typically use a group of buttons on the remote that is dedicated to the control of the DVR.

The user, the remote control and the display form a feedback loop that requires the user to interpret the instructions on the display and to interact with the multitude of buttons on the remote to navigate through the various layers of the STB software to arrive at a desired result. The remote control and the STB in this example do not interact except through the user.

While the evolution of the remote control has proceeded slowly, the devices that remote controls are supposed to control have changed dramatically. Applying the current paradigm to multi-source media system requires either a remote that is complex and multi-buttoned or multiple remotes that will need to be understood by each user of the system.

SUMMARY

Embodiments herein are directed to a remote control that interacts with an intelligent navigation server to produce commands to control a device. The interaction between the remote control device and the intelligent navigation server are orchestrated by a state machine that reacts to user inputs based on a context determined from data available to the state machine.

DETAILED DESCRIPTION

Embodiments herein are directed to a remote control that interacts with an intelligent navigation server to produce commands to control a device. The interaction between the remote control device and the intelligent navigation server are orchestrated by a state machine that reacts to user inputs based on a context determined from data available to the state machine.

The descriptions that follow are provided to illustrate the operation and methodology of the various embodiments and are not intended to be limiting. In particular, while a functional element may be illustrated as being located within a particular structure, other locations of the functional element are possible.

In the description that follows, the term "hard button" or "fixed button" encompasses a physical button, switch, joystick, wheel or similar element that may be activated by a user to enter a command to a device, which command has been pre-associated with the hard or fixed button.

In the description that follows, the term "soft button" is a graphical representation of any of the foregoing, that may be activated by a user to enter a command to a device, which command may be determined by the selection of other commands, by the order of previous command selections, and by the present and/or past behavior of the user.

In the description that follows, the term "controlled device" encompasses devices that may be controlled remotely via commands issued from a remote control device and includes, for example, a set top terminal, a DVR, a PVR, a CD player/recorder, a DVD player/recorder, a Blu-ray player/recorder, a VCR, a video display, a computer, a lighting system, an alarm system, an audio device, an AV receiver, a gateway, and a network controller among others.

In the description that follows, the term "computing device" encompasses, for example, desktop computers, laptop computers and mobile devices and other processor-equipped devices that may be developed in the future that may be configured to permit a user to interact other devices over a network. As used herein, a "mobile device" encompasses cellular telephones, personal data assistants (PDA), and smart telephones.

In the description that follows, a "server" is a computing device that may be configured with "server software" to interact in an automated fashion with "client software" operating to serve content, web pages, and information. The server software and the client software may reside on the same physical device as the client computing component or on a different physical device that is accessible to the client software over a network.

In an embodiment a remote control device interacts with an intelligent navigation server to produce commands to control a device. The intelligent navigation server may be a standalone device, may be integrated in whole or in part with the remote control device, may be integrated in whole or in part with the controlled device, and may be accessible to the remote control device and to the controlled device via a network connection.

Figure 1:
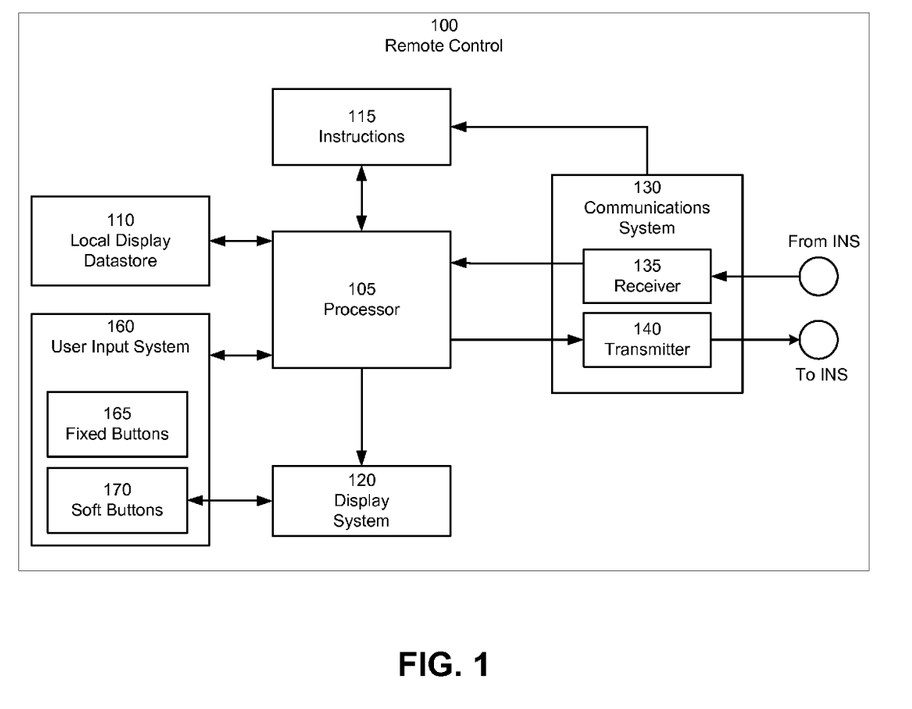
FIG. 1 is a block diagram illustrating a remote control device according to an embodiment.
Figure 2A:
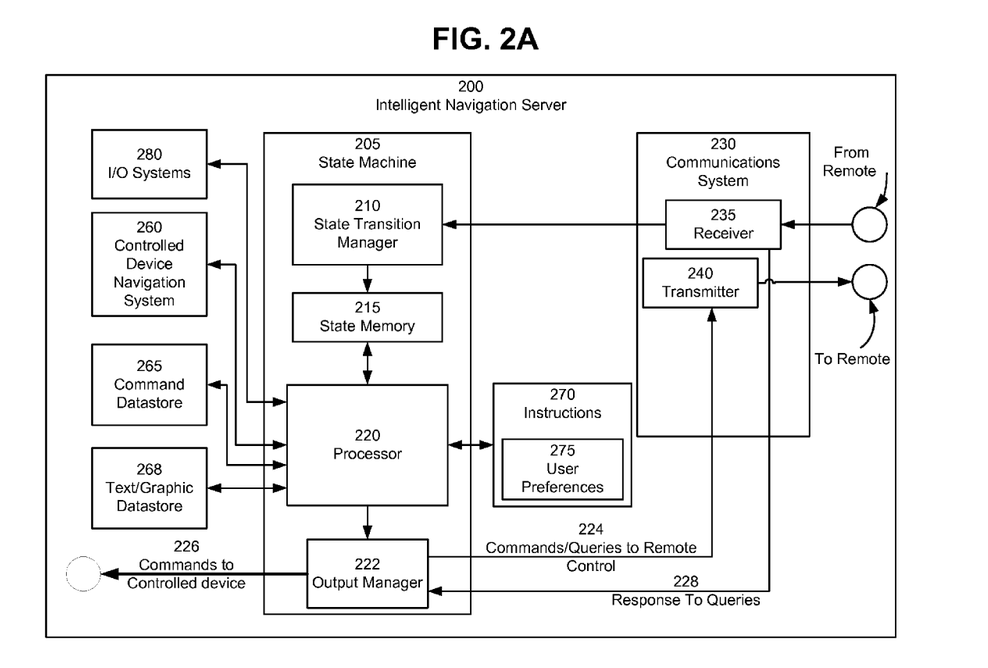
FIG. 2A is a block diagram illustrating an intelligent navigation server comprising a state machine according to an embodiment.

FIG. 1 is block diagram illustrating components of a remote control device according to an embodiment. FIG. 2A is a block diagram illustrating components of an intelligent navigation server comprising a state machine according to an embodiment.

In an embodiment, the remote control 100 comprises a processor 105, a local datastore 110, instructions 115, a display system 120, a communications system 130, and a user input system 160. In an embodiment, the display system 120 displays text, graphics, and video information to a user. User input system 160 comprises a set of "fixed buttons" 165 for selecting pre-defined commands and a set of "soft" buttons 170 for selecting context-sensitive commands (as described in more detail below). The soft buttons 170 are initially appropriate to a current state of the device controlled by remote control 100. In an embodiment, display system 120 may be a touch-sensitive screen that displays graphics and/or text data, including data representing the soft buttons 170 of user input system 160.

When a user selects a fixed or soft button on remote control 100, the command associated with the selected button is referred to the processor 105. The processor executes instructions 115 and determines whether instructions can be executed locally or requires interaction with the INS 200. For example, turning the remote control on/off may not require communication with the intelligent navigation server 200. Alternatively, powering the remote control 100 on or off may be communicated to the INS 200 to allow that device to determine whether to attempt further communications with remote control 100.

The remote control 100 may be implemented as a standalone device, or it may be implemented in a device that provides other functionality. By way of illustration and not by way of limitation, the remote control 100 may be implemented in a PDA, a smartphone, or a computing device such as a laptop computer or a notebook computer.

Instructions that are to be sent to the INS 200 are forwarded by the processor 105 to a transmitter 140. In an embodiment, the remote control 100 and the INS 200 communicate using a Bluetooth protocol. However, this not meant as a limitation. For example, such communications may be provided using a WiFi protocol, an infrared protocol, or other wireless protocol. Communication between the remote control 100 and the INS 200 may also be performed over a network as further described below.

In an embodiment, the INS 200 comprises a state machine 205, a communications system 230, a controlled device navigation system 260, a command datastore 265 and an I/O system 280. In an embodiment, the I/O system 280 provides functionality to the INS 200 for connecting keyboards, monitors, mice, and other input devices to administer the INS 200.

In an embodiment, the controlled device navigation system 260 comprises a graphical user interface that allows a user to interact with the controlled device and to issue instructions to the controlled device. By way of illustration and not by way of limitation, the controlled device navigation system 260 may include various menu functions that allow a user to set user preferences, to configure the controlled device, and to access specific functions of the controlled device. When the controlled device is a set top terminal, the controlled device navigation system 260 may include an interactive program guide (IPG) to allow the user to select programs for viewing and/or recording.

When a command is forwarded from the processor 105 to the INS 200, the remote control 100 has "transitioned" from a previous state to a state represented by the execution of the command by the controlled device. By way of illustration and not by way of limitation, a transition may occur with the issuance of a command to display an IPG, to display a search engine, and to display a video on demand menu. As discussed below, the transition to the new current state in conjunction with a context for the transition may be used to select display data for the remote control 100. These display data may include graphics, text and soft buttons 170 that are linked to commands appropriate to the new current state.

The transitional command is communicated to the receiver 235 within communications system 230 and passed to a state transition manager 210 within a state machine 205. The state transition manager 210 detects the transition and sends the new current state to the state memory 215. In an embodiment, the state memory 215 stores the new current state. Both the new current state and the previous current state are evaluated by the processor 220 in accordance with instructions 270.

Processor 220 communicates with navigation system 260 and with the user preferences and/or past behaviors stored in a user preference memory 275 to determine whether a context exists for the transition to the new current state that would affect the selection of the command set. Because user preferences and past behaviors vary, the selection of the command set may be different for different users transitioning from a current state to the new current state.

By way of illustration and not by way of limitation, in an embodiment, the device to be controlled is a set top terminal. In this embodiment, the controlled device navigation system 260 includes an interactive program guide (IPG). A user may navigate to a search engine while watching a program selected from the IPG. The command set may include commands that display a QWERTY keyboard to receive the user's search terms. The context of transitioning from a scheduled program to a search engine may cause the results of the search to be selected from a list of schedule programs. If the user had navigated to the search engine while watching a program on a VOD channel, the search results may be selected from a list other VOD programs and not from scheduled programs. If the user is watching a program or a VOD program with a particular actor who is identified in a user's profile, the search results may be selected from other programs or films in which the actor appears.

In another embodiment, a user may use the IPG to select a program. The program may be viewable in progress, available for viewing from the beginning or available for recording in its entirety at a later time. The instruction set in this example causes the remote control device 100 to display these options to the user and to also provide the user a soft button to exit the IPG component of the controlled device navigation system 260. Selecting of one of the three options will again affect the state of remote control 100 and cause the processor 220 to determine a new context associated with the new current state using the instructions 270. Processor 220 communicates with command datastore 265 to determine the commands that are associated with the context of the new current state of remote control 100. The processor 220 communicates these commands to the output manager 222. The processor 220 may also select graphics and/or text data from text/graphical datastore 268. In this embodiment, the output manager 222 communicates these commands and the text and/or graphical data to the transmitter 240 via path 224.

The commands and the text and/or graphical data are received at the receiver 135 within communications system 130 of remote control 100. The receiver 135 in remote control 100 passes the commands and the text and/or graphical data to processor 105. Processor 105 communicates with local data store 110 and using instructions 115 issues new display data for display system 120 that include the command options available to the user in the form of the soft buttons 170 and the text and/or graphical data. One or more of the soft buttons 170 may be linked with one or more of the commands that are associated with the new current state of the remote control 100.

In an embodiment, the new display data comprises soft button graphics and text and/or graphical data to allow the user to select one of the options associated with the current state of remote control 100. The selection of an option by the user is communicated to the receiver 235 and from the receiver 235 to the state machine 205. The state transition manager 210 recognizes that a navigation path has reached a "terminal" state and instructs the output manager 222 to communicate one or more commands to the controlled device via link 226. The link 226 may be a wired or wireless connection that connects the controlled device to the INS 200. The wired or wireless connection may be provided by a network.

In an embodiment, the user may opt-in for the system to keep a history of navigation paths executed by this user. In this embodiment, the instructions 270 may further comprise user preferences stored in user preference memory 275. In an embodiment, the INS 200 may use these preferences to predict the user's ultimate destination state. In this embodiment, the output manager 222 may cause a query to be sent over link 224 for transmission to the remote control 100 using the transmitter 240.

Figure 2B:
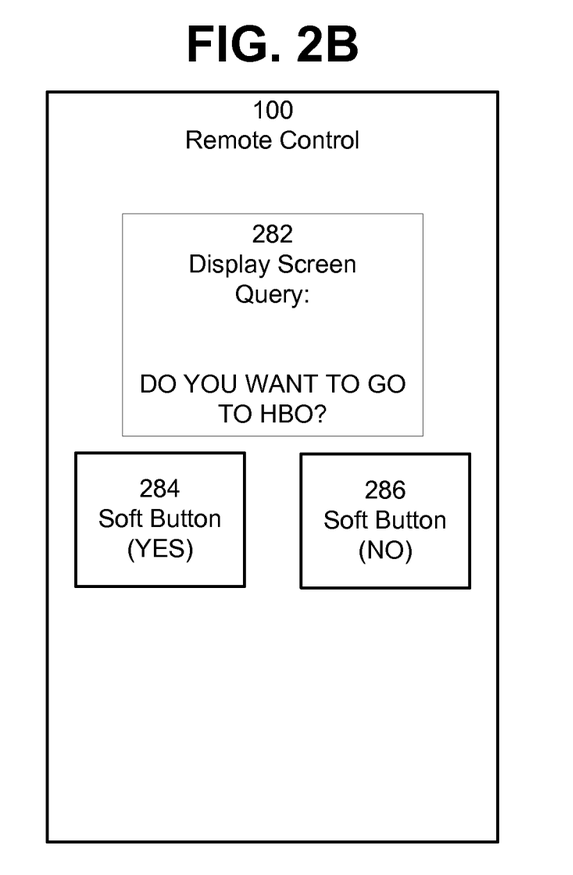
FIG. 2B is a block diagram illustrating the appearance of an automated query on a remote control according to an embodiment.

FIG. 2B is a block diagram illustrating the appearance of an automated query on a remote control according to an embodiment. By way of illustration and not by way of limitation, a confirmation query may appear on display screen 282 of remote control 100 in the form, "DO YOU WANT TO GO TO HBO?" The confirmation query may be displayed along with two soft buttons. The soft button 284 provides the user the ability to answer the query "YES." The soft button 286 provides the user the ability to answer the query "NO." The selection of one of the soft buttons 284 or 286 is sent to the INS 200 using the transmitter 140 (see, FIG. 1). When the answer to the confirmation query is "YES," that is, when the user presses the soft button 284, the response is communicated by transmitter 140 (FIG. 1) to the receiver 235 (FIG. 2A) and then to the output manager 222 via path 228. The output manager 222 sends one or more commands to the device to be controlled via path 226.

In another embodiment, the output manager 222 may cause a query to be sent over link 224 for transmission to the remote control 100 using the transmitter 240 asking whether the user would prefer not to receive confirmation queries in the future. If the user responds in the affirmative, the INS 200 will thereafter issue commands to the controlled device based on its prediction of the user's ultimate destination state.

In another embodiment, when the user has elected to opt out of receiving confirmation queries, the remote control 100 may display a soft button that allows the user to instruct the INS 200 that its prediction of the ultimate destination state is incorrect. Selection of the "incorrect destination" soft button may cause the INS 200 to instruct the remote control 100 to display additional soft buttons to allow the user to manually navigate to the desired destination state and to adjust its prediction algorithms to better reflect the user's intent.

Figure 3A:
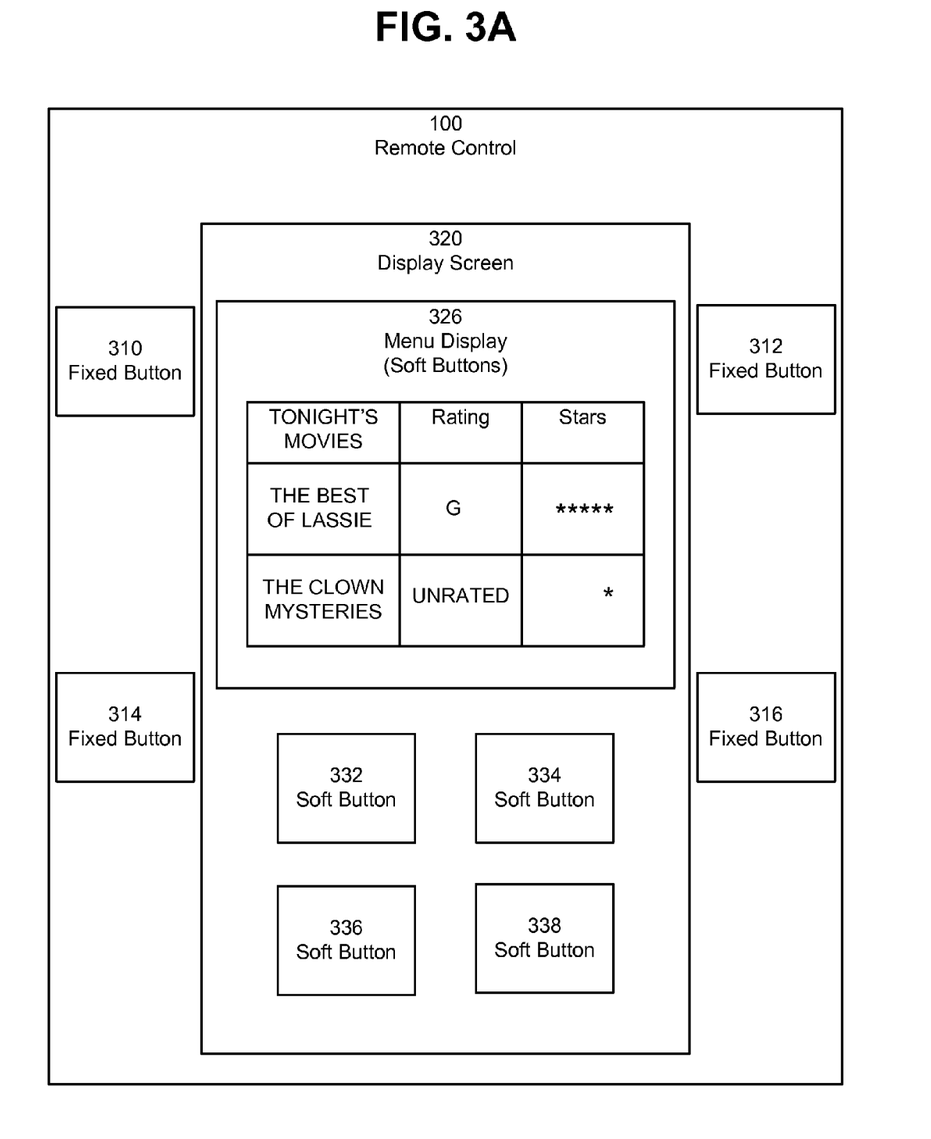
FIG. 3A is a block diagram illustrating the appearance of remote control 100 before a user has made a program selection for viewing according to an embodiment.
Figure 3B:
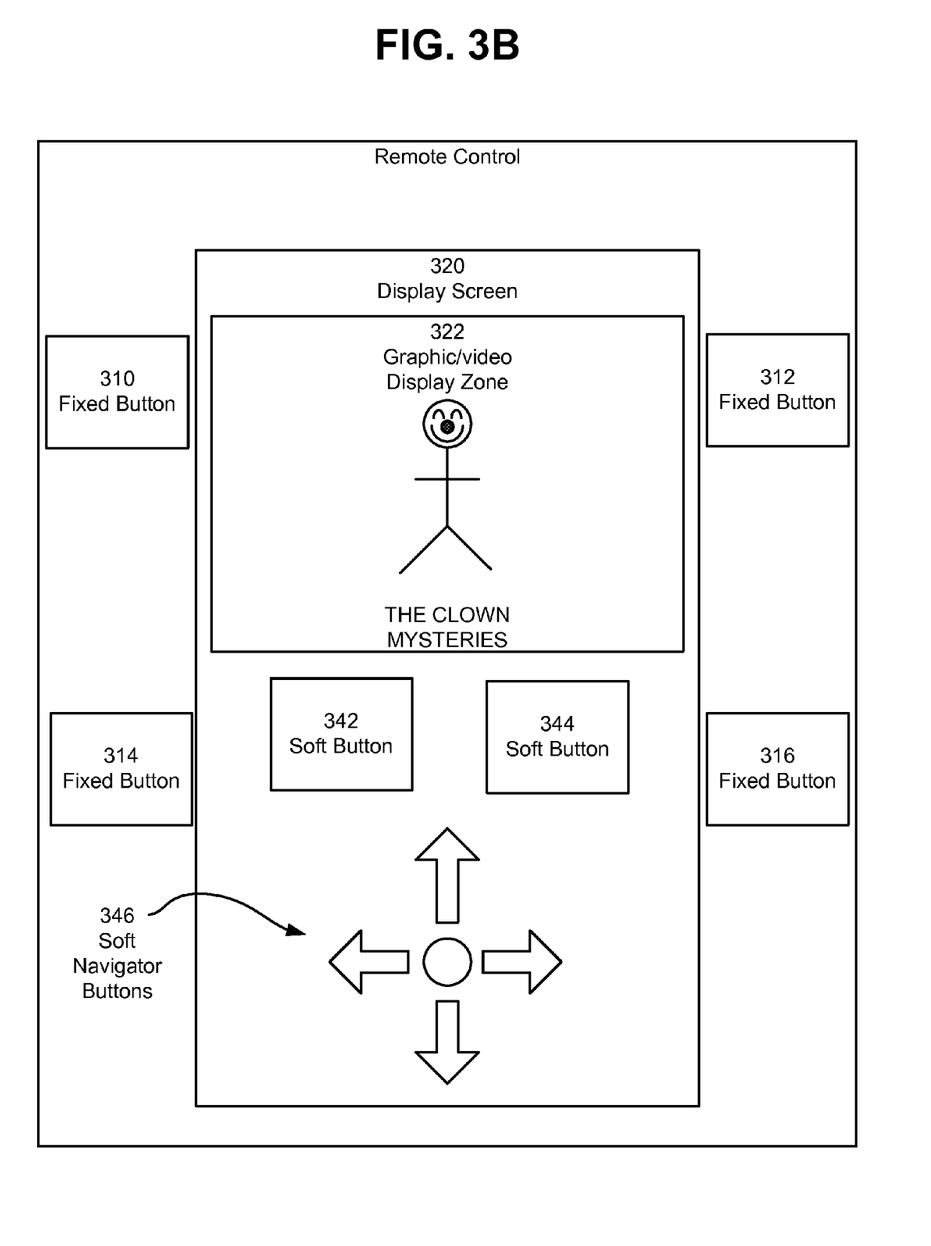
FIG. 3B is a block diagram illustrating the appearance of remote control 100 after the user has selected a program for viewing according to an embodiment

FIGS. 3A and 3B illustrate context-sensitive display data on a remote control according to an embodiment.

In this embodiment, the controlled device is a set top terminal. FIG. 3A is a block diagram illustrating the appearance of remote control 100 before a user has made a program selection for viewing according to an embodiment. A current state of remote control 100 produces a context-sensitive state illustrated in FIG. 3A. In this state, remote control 100 comprises fixed buttons 310, 312, 314, and 316. Display screen 320 displays soft buttons 332, 334, 336, and 338 and menu display 326. Menu display 326 comprises additional soft buttons that allow a user to select a movie from an IPG.

FIG. 3B is a block diagram illustrating the appearance of remote control 100 after the user has selected "The Clown Mysteries" for viewing according to an embodiment. The menu display 326 has been replaced by a graphics/video display zone 322. In this embodiment, a trailer of the movie is playing on the remote control display screen 320 display zone 322. Soft buttons 332, 334, 336, and 338 are no longer visible. Soft buttons 342 and 344 are displayed along with soft navigator buttons 346.

FIGS. 3A and 3B illustrate that the remote control 100 presents a limited set of buttons to a user based on the selections of the user. As the user's selections navigate the user deeper into the navigation system of the intelligent navigation server 200 (see FIG. 2, 260), the number of forward paths diminishes and, consequently, so will the number of context-sensitive display elements. The interaction between the remote control 100 and the INS 200 thus provides the user only those soft buttons relevant to selecting a navigation path to a particular program or task. By way of illustration and not by way of limitation, when the context indicates that a user may require access to channel selection functions, a keypad of soft buttons may be displayed. However, where the context indicates that channel selection functions are not required, the keypad will not be displayed. This feature keeps the number of keys on the remote control 100 to a minimum based on the context in which a transition from a current state to a new current state has occurred.

Figure 4A:
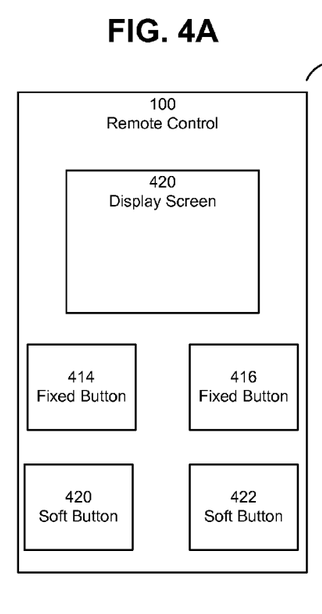
FIG. 4A is a block diagram illustrating the appearance a context-sensitive current state of a remote control according to an embodiment.
Figure 4B:
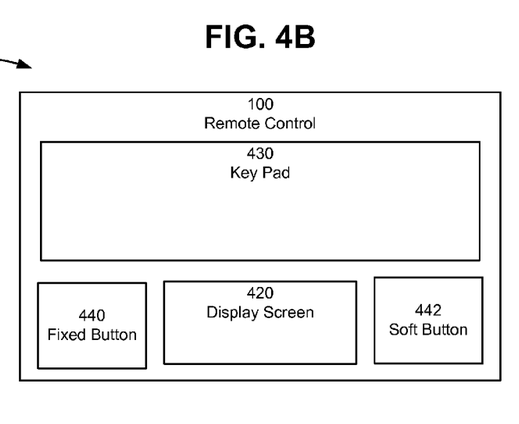
FIG. 4B is a block diagram illustrating the display of a keyboard on a remote control according to an embodiment.

FIGS. 4A and 4B illustrate context-sensitive display data on a remote control device according to another embodiment.

A current state of the remote control 100 produces a context-sensitive state illustrated in FIG. 4A. In this state, the remote control 100 comprises the fixed buttons 414 and 416, display screen 420, and the soft buttons 420 and 422. Additionally, the user input system 160 (see FIG. 1) relates the physical orientation of the remote control 100. That is, the remote control 100 is associated with a vertical state and a horizontal state that is communicated to the state machine 205 of the INS 200 (see FIG. 2).

FIG. 4B illustrates the appearance of remote control 100 after the user has selected a button that requires display data to be shown horizontally. By way of illustration and not as a limitation the user may have navigated to a state within the navigation system where a "search option" is available or where the user may enter a URL of a website. Upon selection by the user of the option requiring a horizontal display, the state machine 205 of the INS 200 sends remote control 100 display data that causes a data input "device" 430 (for example, a QWERTY keyboard or a keypad) to be displayed along with fixed button 440 and soft button 442. If the remote control state is vertical, the state machine 205 of the INS 200 sends remote control 100 a message for display on display screen 420 instructing the user to rotate remote control 100. User input may then be accepted from key pad 430.

The remote control 100 and the INS 200 have thus far been described in the context of a controlling a set top terminal. However, these features are not so limited but may be utilized with any device that may be controlled by commands issued remotely. For example, the device to be controlled may be a VCR, a DVR, a PVR, a DVD player/recorder, a Blu-ray player/recorder, a lighting system, an audio system, a video display system, and a security system among others. A controlled device may have a command datastore (FIG. 2, 265) that may also define one or more navigation pathways. A controlled device may also have a navigation system (FIG. 2, 260) that provides a graphical user interface to aid a user in selecting a function for the controlled device to perform. The command datastore 265 and the navigation system 260, if any, of a controlled device is accessed by the state machine 205 to produce context-sensitive displays on the remote control 100.

The various functional elements of the INS 200 as illustrated in FIG. 2 may be combined and/or distributed in various configurations.

Figure 5:
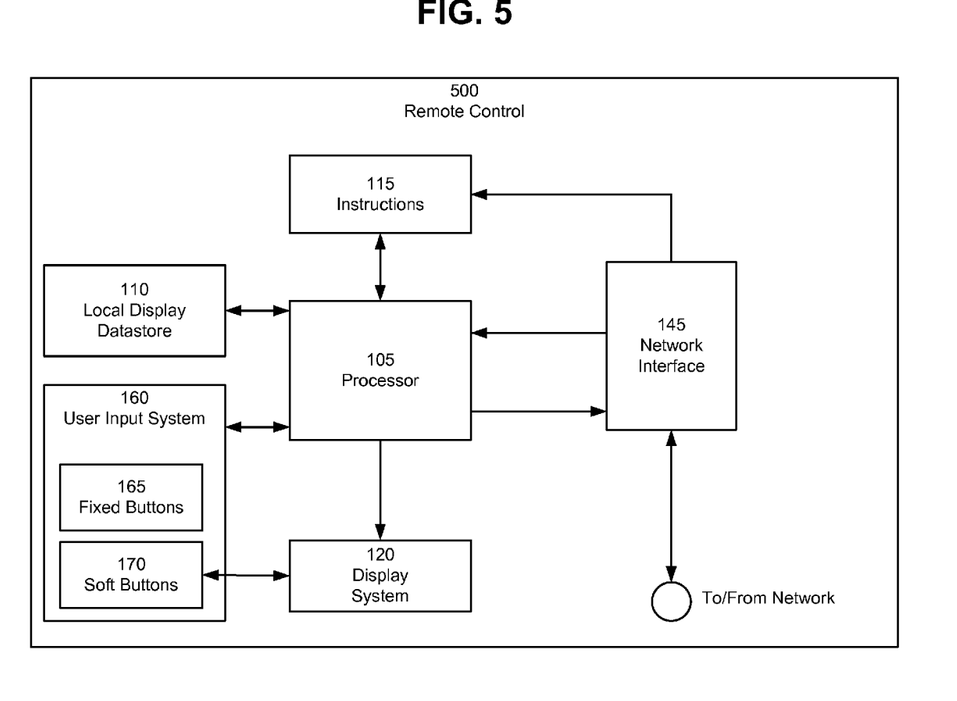
FIG. 5 is a block diagram illustrating a remote control device having network connectivity according to an embodiment.
Figure 6:
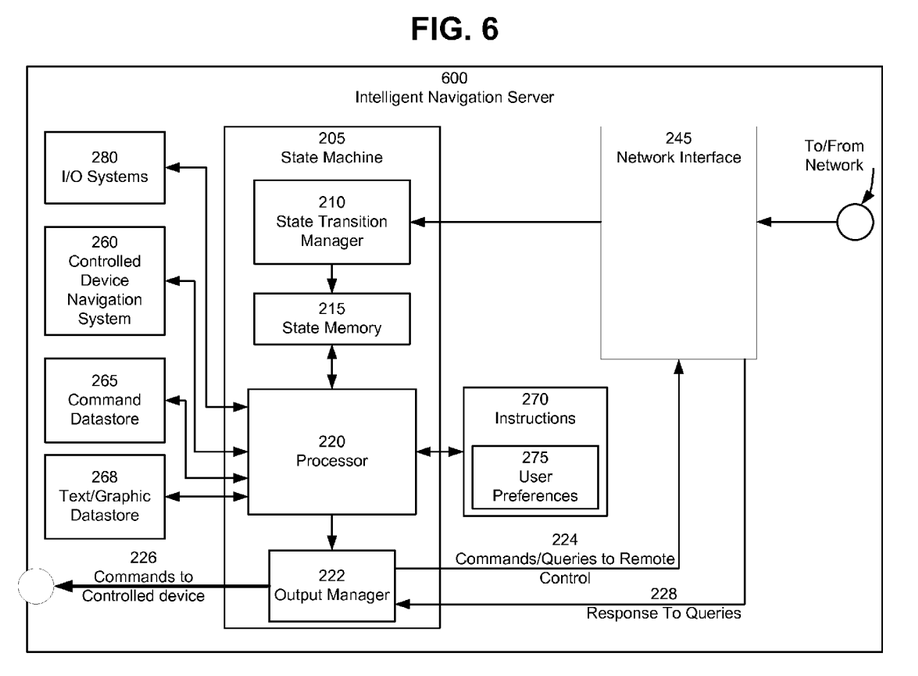
FIG. 6 is a block diagram illustrating an intelligent navigation server having network connectivity and comprising a state machine according to an embodiment.

FIGS. 5 and 6 illustrate a remote control that may communicate with an intelligent navigation server via a network connection. The remote control 500 illustrated in FIG. 5 is functionally similar to the remote control 100 illustrated in FIG. 1 with the exception that the communications system 135 of the remote control 100 has been replaced with network interface 145. The INS 600 illustrated in FIG. 6 is functionally similar to the INS 200 illustrated in FIG. 2 with the exception that the communications system 235 of the INS 200 has been replaced with network interface 245. The network interfaces 145 and 245 allow the remote control 500 to communicate with the INS 600 via a network (see FIG. 7A discussed below). In an embodiment, the output manager of the INS 600 may issue commands to the controlled device via link 226 as previously described.

Figure 7A:
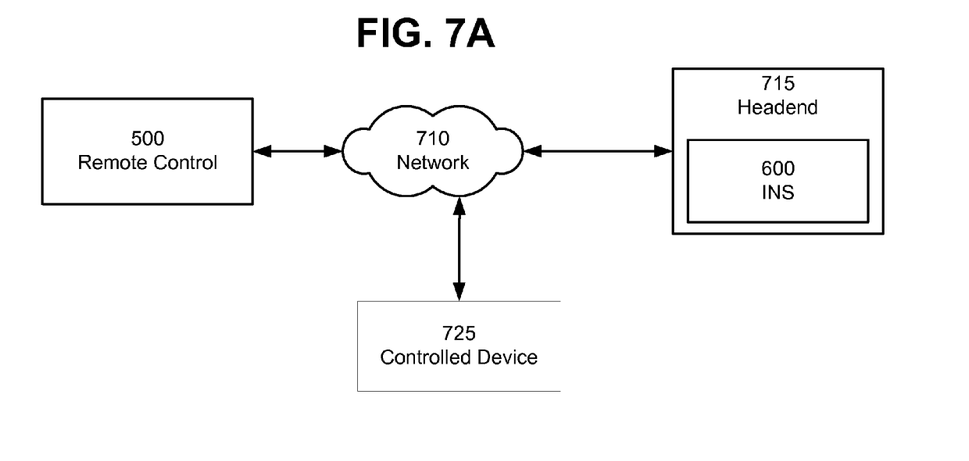
FIGS. 7A and 7B are block diagrams illustrating alternate configurations of a remote control and an intelligent navigation server according to embodiments.
Figure 7B:
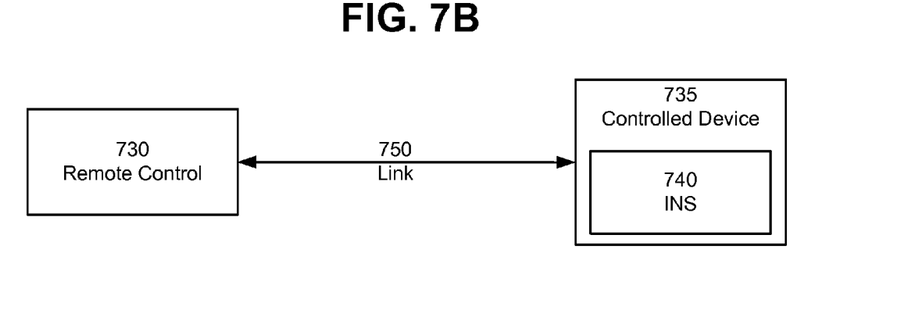

FIGS. 7A and 7B are block diagrams illustrating alternate configurations of a remote control and an intelligent navigation server according to embodiments. Referring to FIG. 7A, a remote control 705 communicates with a headend 715 via a network 710. The headend 715 comprises an intelligent navigation server 600. In this configuration, the commands to the controlled device 725 are issued from the INS 600 via the network 710. Thus, the remote control 500, the INS 600 and the controlled device 725 are all networked devices. The network connectivity of these devices also makes it possible to update the software and firmware of these devices remotely.

Referring to FIG. 7B, a controlled device 735 comprises an intelligent navigation server 740. A remote control 730 communicates via a link 750 with the controlled device 735. The link 750 may be a network path, in which case the remote control 730 may comprise the elements as illustrated in FIG. 5 and the INS 740 may comprise the elements as illustrated in FIG. 6. Alternatively, the link 750 may be a provided by signals generated and received by the remote control 730 and the INS 740. In this case the remote control 730 may comprise the elements as illustrated in FIG. 1 and the INS 740 may comprise the elements as illustrated in FIG. 2.

The foregoing method descriptions and the process flow diagrams are provided merely as illustrative examples and are not intended to require or imply that the blocks of the various embodiments must be performed in the order presented. As will be appreciated by one of skill in the art the order of blocks in the foregoing embodiments may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

In one or more exemplary aspects, the functions described may be implemented in hardware, software, firmware, or any combination thereof. If implemented in software, the functions may be stored on or transmitted over as one or more instructions or code on a computer-readable medium. The blocks of a method or algorithm disclosed herein may be embodied in a processor-executable software module which may reside on a computer-readable medium. Computer-readable media includes both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a machine readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the scope of the invention. Thus, the present invention is not intended to be limited to the embodiments shown herein but is to be accorded the widest scope consistent with the following claims and the principles and novel features disclosed herein.

It will be understood by those skilled in the art that the present invention may be embodied in other specific forms without departing from the scope of the invention disclosed and that the examples and embodiments described herein are in all respects illustrative and not restrictive. Those skilled in the art of the present invention will recognize that other embodiments using the concepts described herein are also possible. Further, any reference to claim elements in the singular, for example, using the articles "a," "an," or "the" is not to be construed as limiting the element to the singular.

What is claimed is:

1. A method for commanding a controlled device comprising:
    detecting at a first processor a transition from a current state of a remote control device to a new current state, wherein the current state of the remote control device represents a first state of the controlled device after receipt and execution of a first command issued by the remote control device to the controlled device, and wherein the new current state represents a second state of the controlled device after receipt and execution of a second command issued by the remote control device to the controlled device that succeeds the first command;
    determining a context from the transition from the first state of the controlled device to the second state of the controlled device;
    evaluating at the first processor the first state, the second state and the context to select a set of commands appropriate to the context and the second state, wherein the selected commands determine behavior options for the controlled device; and
    sending the set of selected commands to the remote control device.

2. The method of claim 1, wherein the controlled device is selected from the group consisting of a set top terminal, a VCR, a DVR, a PVR, a DVD player/recorder, a Blu-Ray player/recorder, a lighting system, an audio system, a video display system, and a security system.

3. The method of claim 1, wherein the remote control device comprises a second processor and wherein the method further comprises:
    generating by the second processor display data based on the selected commands, wherein the display data comprise one or more soft buttons linked to one or more of the selected commands; and
    displaying the one or more soft buttons.

4. The method of claim 1, wherein determining the context for the transition further comprises:
    receiving at the first processor user profile data; and
    determining the context at least in part from the user profile data.

5. The method of claim 4, wherein the user profile data comprise historical data of paths selected by a user of the remote control device through a navigation structure of the controlled device.

6. The method of claim 4 further comprising predicting from the context an ultimate destination state.

7. The method of claim 6 further comprising:
    sending to the remote control device a request for confirmation that the predicted ultimate destination state is correct;
    selecting a set of commands appropriate to the predicted ultimate destination state when the predicted ultimate destination state is confirmed; and
    sending the set of selected destination state commands to the remote control device.

8. The method of claim 7 further comprising:
    receiving a response that the predicted ultimate destination is incorrect; and
    sending to the remote control device one or more navigation objects to facilitate user selection of a path to the ultimate destination state.

9. The method of claim 8 further comprising modifying one or more prediction algorithms to correctly predict from the context the ultimate destination state.

10. The method of claim 1, wherein the first processor and second processor communicate via a wireless link.

11. The method of claim 1, wherein the first processor and second processor communicate via a network.

12. The method of claim 1, wherein the display data further comprise graphical data and wherein the method further comprises displaying the graphical data.

13. The method of claim 1, wherein the display data further comprise text data and wherein the method further comprises displaying the text data.

14. A system for commanding a controlled device comprising:
an intelligent navigation server having a first processor;
a remote control device;
a link connecting the remote control device and the intelligent navigation server;
wherein the first processor is configured with software executable instructions that cause the intelligent navigation server to perform operations comprising:
detecting a transition from a current state of a remote control device, wherein the current state of the remote control device represents a first state of the controlled device after receipt and execution of a first command issued by the remote control device to the controlled device, and wherein the new current state represents a second state of the controlled device after receipt and execution of a second command issued by the remote control device to the controlled device that succeeds the first command;
determining a context from the transition from the first state of the controlled device to the second state of the controlled device;
evaluating at the first processor the first state, the second state and the context to select a set of commands appropriate to the context and the second state, wherein the selected commands determine behavior options for the controlled device; and
sending the set of selected commands to the remote control device.

15. The system of claim 14, wherein the controlled device is selected from the group consisting of a set top terminal, a VCR, a DVR, a PVR, a DVD player/recorder, a Blu-Ray player/recorder, a lighting system, an audio system, a video display system, and a security system.

16. The system of claim 14, wherein the remote control device comprises a second processor and a display and wherein the second processor is configured with software executable instructions that cause the remote control to perform operations comprising:
generating display data based on the selected commands, wherein the display data comprise one or more soft buttons linked to one or more of the selected commands; and
displaying the one or more soft buttons on the display.

17. The system of claim 14, wherein the instruction for determining the context for the transition further comprises instructions for:
receiving at the first processor user profile data; and
determining the context at least in part from the user profile data.

18. The system of claim 17, wherein the user profile data comprise historical data of paths selected by a user of the remote control device through a navigation structure of the controlled device.

19. The system of claim 17, wherein the first processor is further configured with software executable instructions that cause the intelligent navigation server to perform operations comprising predicting from the context an ultimate destination state.

20. The system of claim 19, wherein the first processor is further configured with software executable instructions that cause the intelligent navigation server to perform operations comprising:
sending to the remote control device a request for confirmation that the predicted ultimate destination state is correct;
selecting a set of commands appropriate to the predicted ultimate destination state when the predicted ultimate destination state is confirmed; and
sending the set of selected destination state commands to the remote control device.

21. The system of claim 20, wherein the first processor is further configured with software executable instructions that cause the intelligent navigation server to perform operations comprising:
receiving a response that the predicted ultimate destination is incorrect; and
sending to the remote control device one or more navigation objects to facilitate user selection of a path to the ultimate destination state.

22. The system of claim 21, wherein the first processor is further configured with software executable instructions that cause the intelligent navigation server to perform operations comprising modifying one or more prediction algorithms to correctly predict from the context the ultimate destination state.

23. The system of claim 14, wherein the first processor and second processor communicate via a wireless link.

24. The system of claim 14, wherein the first processor and second processor communicate via a network.

25. The system of claim 14, wherein the display data further comprise graphical data and wherein the method further comprises displaying the graphical data.

26. The system of claim 14, wherein the display data further comprise text data and wherein the method further comprises displaying the text data.

* * * * *

UNITED STATES PATENT AND TRADEMARK OFFICE
CERTIFICATE OF CORRECTION

PATENT NO. : 8,458,748 B2  
APPLICATION NO. : 12/763316  
DATED : June 4, 2013  
INVENTOR(S) : Jay Thomas et al.

It is certified that error appears in the above-identified patent and that said Letters Patent is hereby corrected as shown below:

Title page, item (73) Assignee

Please delete "Time Warner Cable, Inc." and insert --Time Warner Cable Enterprises LLC--

Signed and Sealed this
Twenty-first Day of July, 2015

Michelle K. Lee
*Director of the United States Patent and Trademark Office*